(12) United States Patent
Leborgne et al.

(10) Patent No.: US 11,007,688 B2
(45) Date of Patent: May 18, 2021

(54) VEHICLE TRIM ELEMENT AND MANUFACTURING METHOD THEREOF

(71) Applicant: FAURECIA INTERIEUR INDUSTRIE, Nanterre (FR)

(72) Inventors: Olivier Leborgne, Warluis (FR); Didier Ponthieu, Neuville Saint Pierre (FR)

(73) Assignee: FAURECIA INTERIEUR INDUSTRIE, Nanterre (FR)

(*) Notice: Subject to any disclaimer, the term of this patent is extended or adjusted under 35 U.S.C. 154(b) by 0 days.

(21) Appl. No.: 16/499,784

(22) PCT Filed: Mar. 30, 2018

(86) PCT No.: PCT/EP2018/058357
§ 371 (c)(1),
(2) Date: Sep. 30, 2019

(87) PCT Pub. No.: WO2018/178370
PCT Pub. Date: Oct. 4, 2018

(65) Prior Publication Data
US 2020/0031033 A1   Jan. 30, 2020

(30) Foreign Application Priority Data
Mar. 30, 2017  (FR) ...................................... 1752697

(51) Int. Cl.
*B29C 45/14*  (2006.01)
*B29C 41/20*  (2006.01)
(Continued)

(52) U.S. Cl.
CPC ........ *B29C 45/14073* (2013.01); *B29C 41/20* (2013.01); *B29C 41/22* (2013.01);
(Continued)

(58) Field of Classification Search
CPC ... B29C 45/14073; B29C 41/20; B29C 41/22; B29C 44/14; B29C 70/541; B29C 65/56;
(Continued)

(56) References Cited

U.S. PATENT DOCUMENTS

| 4,892,770 A | 1/1990 | Labrie |
| 5,919,544 A * | 7/1999 | Terajima ............... B29C 43/021 428/116 |

(Continued)

FOREIGN PATENT DOCUMENTS

DE    102012203012 A1    8/2013

OTHER PUBLICATIONS

International Search Report corresponding to International application No. PCT/EP2018/058357, dated May 8, 2018, with translation, 5 pages.

(Continued)

*Primary Examiner* — Brian Handville
(74) *Attorney, Agent, or Firm* — Reising Ethington P.C.

(57) ABSTRACT

A trim element that includes a supporting element having a main surface extending between two opposite edges, a lining layer covering the main surface and the edges of the supporting layer, and a skin surrounding the lining layer. At least one of the edges includes a reinforcing element movably mounted relative to the supporting element between a retracted position and a deployed position wherein at least one portion of the reinforcing element protects from the main surface in such a way as to reduce the length of the portion of the reinforcing element extending in relation to the main surface, the projecting portion being surrounded by the lining layer.

10 Claims, 4 Drawing Sheets

(51) Int. Cl.
 B29C 41/22 (2006.01)
 B32B 5/18 (2006.01)
 B32B 15/04 (2006.01)
 B32B 15/08 (2006.01)
 B29K 75/00 (2006.01)
 B29K 105/04 (2006.01)
 B29K 705/00 (2006.01)
 B29L 31/30 (2006.01)
(52) U.S. Cl.
 CPC .............. *B32B 5/18* (2013.01); *B32B 15/046* (2013.01); *B32B 15/08* (2013.01); *B29K 2075/00* (2013.01); *B29K 2105/04* (2013.01); *B29K 2705/00* (2013.01); *B29L 2031/3041* (2013.01); *B32B 2266/0278* (2013.01)
(58) Field of Classification Search
 CPC ....... B29C 41/18; B29C 44/1257; B32B 5/18; B32B 15/046; B32B 15/08; B32B 2266/0278; B29K 2075/00; B29K 2105/04; B29K 2705/00; B29L 2031/3041
 See application file for complete search history.

(56) References Cited

U.S. PATENT DOCUMENTS 5,945,200 A    8/1999  Suzuki
2013/0285405 A1* 10/2013 Luc ........................ B29C 44/58
                                                    296/1.08

OTHER PUBLICATIONS

Written Opinion corresponding to International application No. PCT/EP2018/058357, dated May 8, 2018, 6 pages.

* cited by examiner

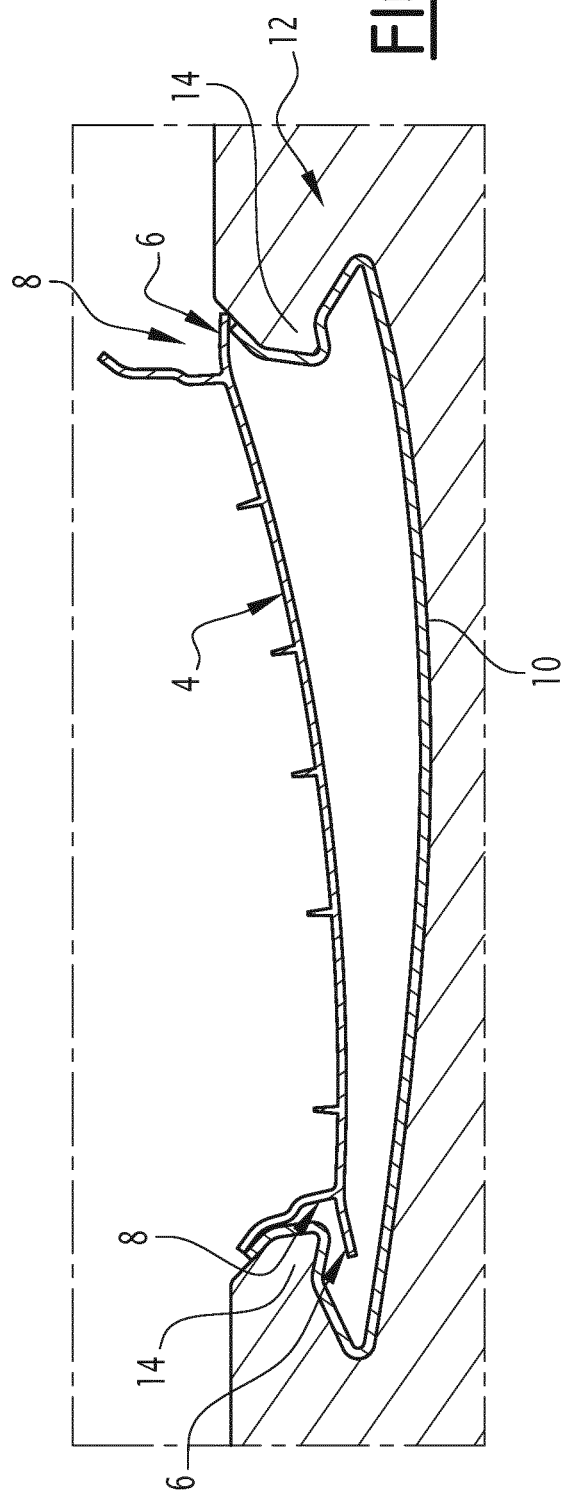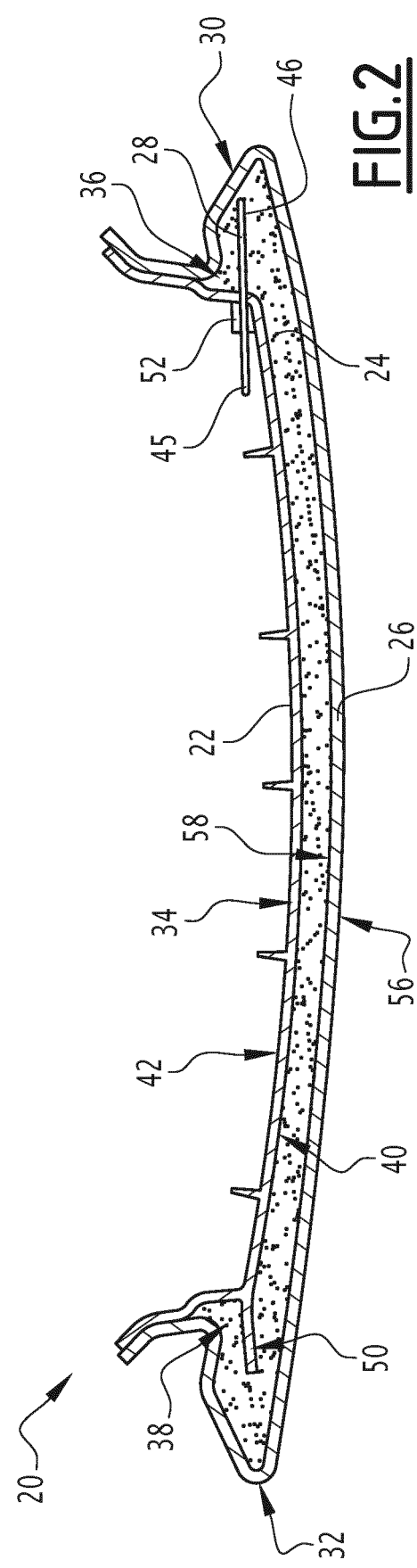

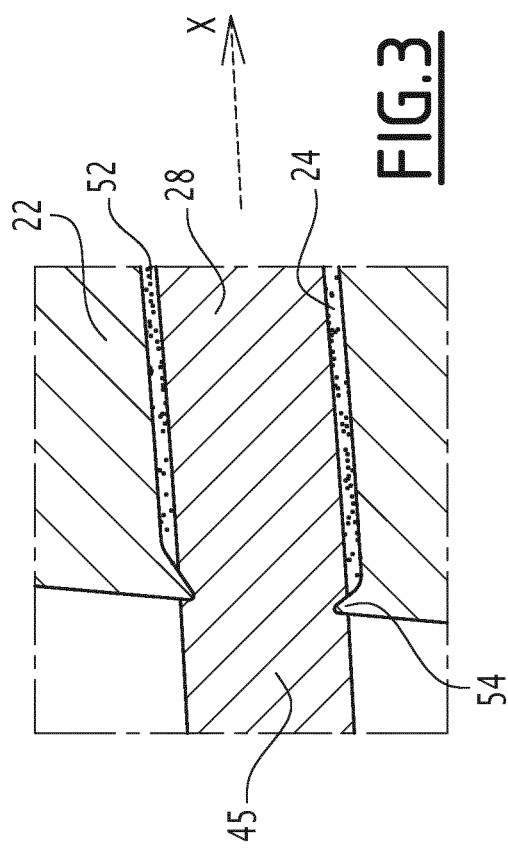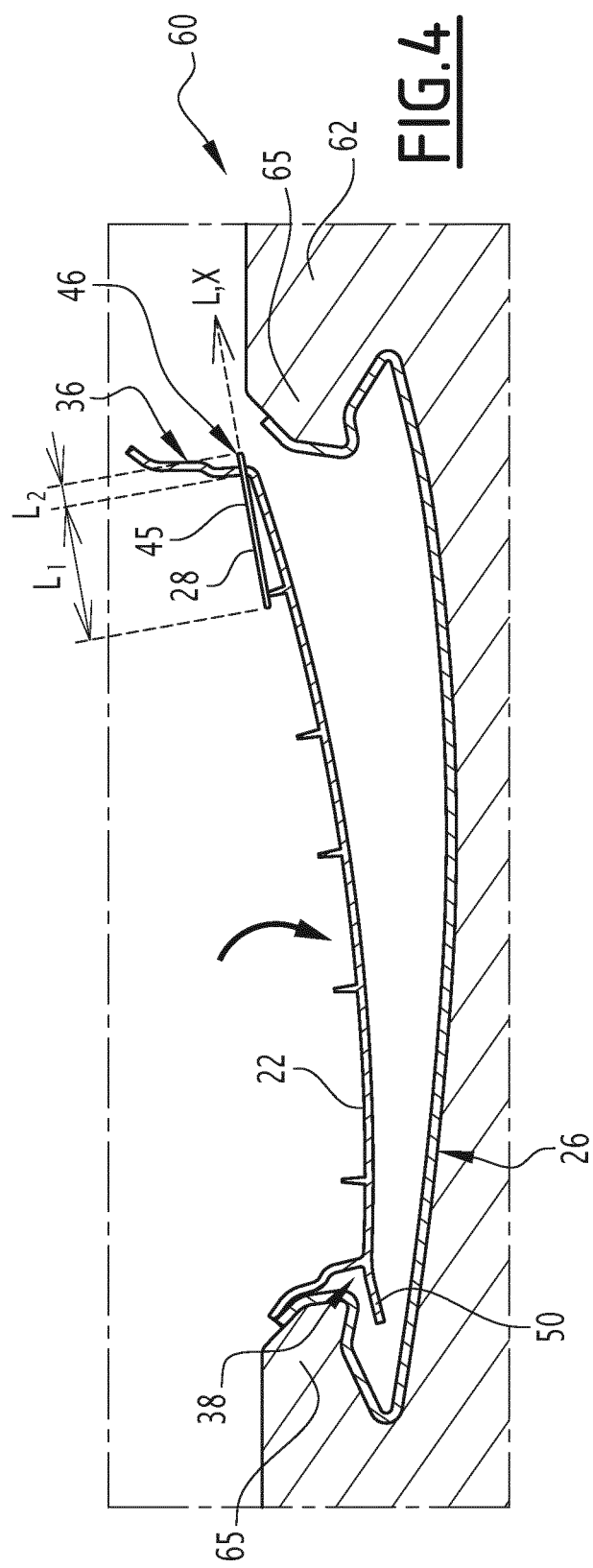

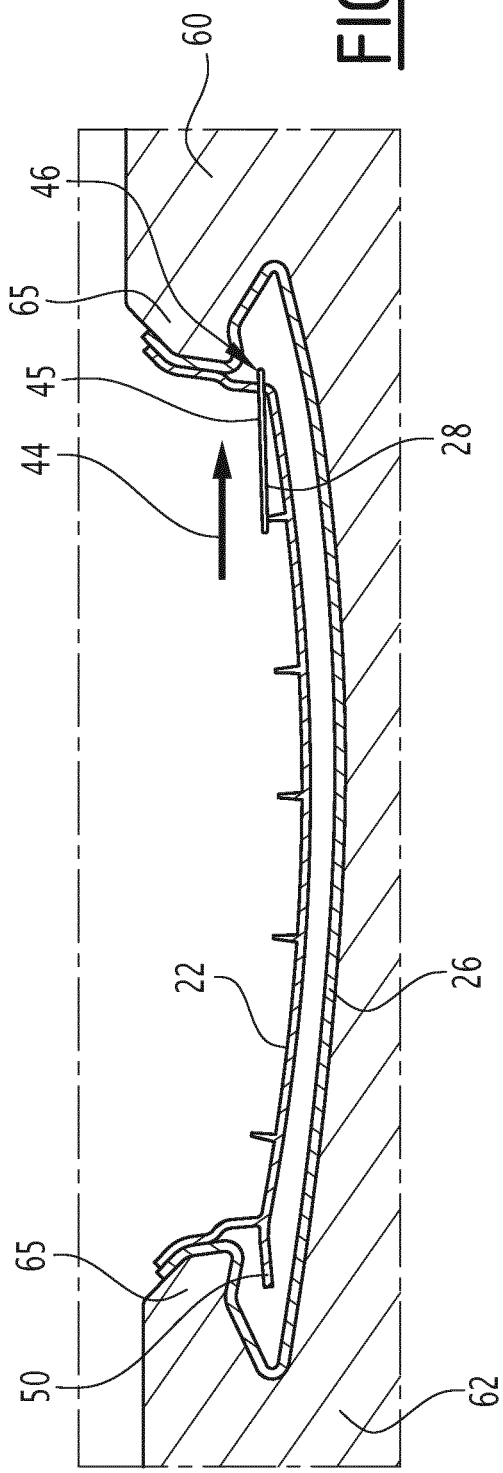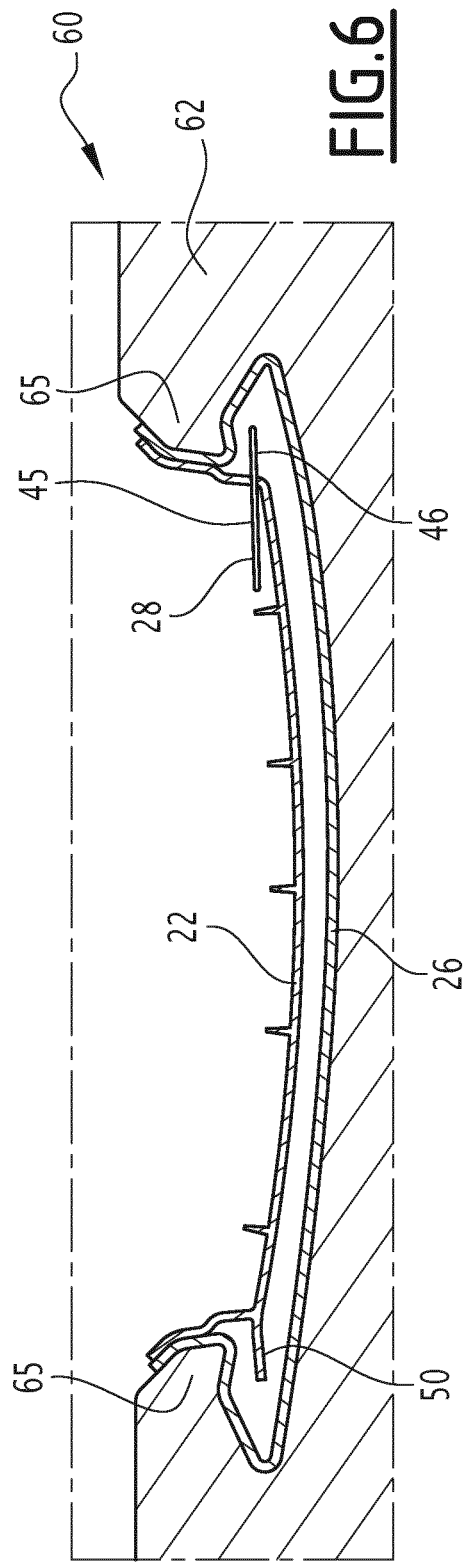

VEHICLE TRIM ELEMENT AND MANUFACTURING METHOD THEREOF

TECHNICAL FIELD

The present invention relates to a vehicle trim element comprising a supporting element having a main surface extending between two opposite edges, a lining layer covering the main surface and the edges of the supporting layer, and a skin surrounding the lining layer.

The invention also relates to a method for producing such a trim element.

BACKGROUND

It is known to manufacture a vehicle trim element, in particular for a motor vehicle comprising a superimposed supporting element, a lining layer that is compressible to the touch and a flexible skin, the lining layer being sandwiched between the supporting element and the skin. The supporting element imparts the desired rigidity to the trim element while the lining layer gives it a pleasant feel and the skin gives it a satisfactory appearance, which makes it possible to obtain a trim element having a satisfactory quality.

The lining layer is for example formed by injecting a material forming a foam between the skin and the supporting element.

Nevertheless, due to the technical manufacturing constraints of the trim element, it is difficult to use a supporting element extending up to the edge of the trim element. As a result, the edge of the trim element has an excessive flexibility that is detrimental to the perceived quality.

For example, the supporting element is formed by an insert introduced into an injection cavity so that it is embedded in the lining layer during the formation of the lining layer. However, during steps for closing the mold and injection, this insert is made to move uncontrollably and the quality and mechanical holding of the formed trim elements are then very random.

To offset this drawback, it is possible to provide for adjusting the size of the supporting element to that of the molding cavity. Thus, FIG. 1 illustrates a step for manufacturing a trim element in which the supporting element 4 includes a reinforcing rib 6 on each edge 8 making it possible to immobilize the supporting element in an injection mold making it possible to produce the lining layer. The skin 10 is placed in a part of an injection mold 12 in order to form a molding cavity between the supporting element and the skin.

However, it clearly appears in FIG. 1 that the placement of the supporting element 4 on the skin 10 in the injection mold 12 is very difficult and risks destroying the injection mold 12 or the supporting element 4. Indeed, the skin 10 and the injection mold 12 have an undercut area 14 opposite each edge that prevents the passage of the reinforcing ribs 6.

SUMMARY

One of the aims of the invention is to propose a vehicle trim element having a satisfactory perceived quality and the manufacturing of which causes few scraps.

To that end, the invention proposes a trim element of the aforementioned type, wherein at least one of said edges comprises a reinforcing element, the reinforcing element being movably mounted relative to the supporting element between a retracted position, wherein the reinforcing element extends primarily opposite the main surface, and a deployed position, wherein at least a portion of the reinforcing element projects from the main surface of the supporting element in such a way as to reduce the length of the portion of the reinforcing element extending in relation to the main surface, said projecting portion being surrounded by the lining layer.

Thus, the reinforcing element makes it possible to impart stiffness to a volume not supported by the main surface of the supporting element at the edge of the supporting element. Furthermore, the reinforcing element being movably mounted on one of the edges, its position is easily controllable. Furthermore, the retractable nature of the reinforcing element makes it easier to manufacture the trim element and improves the reproducibility of the manufacturing method by allowing the insertion of the supporting element into a molding cavity without interference with the latter. This prevents having many discarded trim elements due to manufacturing flaws.

The trim element according to the invention may comprise one or more of the following features, considered individually or according to all technically possible combinations:

the reinforcing element is locked in the deployed position by the lining layer;

the supporting element comprises a guideway, intended to guide the movement of the reinforcing element between the retracted position and the deployed position;

the guideway comprises a sealing gasket extending between the reinforcing element and the supporting element;

the supporting element extends between a first edge and a second edge opposite the first edge, the trim element comprising a reinforcing rib that projects from the first edge, the reinforcing element projecting from the second edge.

The invention also relates to a method for manufacturing a trim element as defined above, comprising the following steps for providing a supporting element, having a main surface extending between two opposite edges, at least one of said edges comprising a reinforcing element, the reinforcing element being movably mounted relative to the supporting element between a retracted position, in which the reinforcing element extends primarily opposite the main surface, and a deployed position, in which at least part of the reinforcing element projects from the main surface of the supporting element so as to reduce the length of the portion of the reinforcing element extending opposite the main surface, providing a skin, placing the supporting element on the skin so as to form a cavity between the supporting element and the skin, said cavity assuming the form of the lining layer, the reinforcing element being in the retracted position during the placement of the supporting element, deploying the reinforcing element toward the deployed position, the reinforcing element extending in the cavity in the deployed position, and forming the lining layer in the cavity.

The manufacturing method according to the invention may comprise one or more of the following features, considered individually or according to all technically possible combinations:

the formation of the lining layer comprises the injection of a foam precursor material between the supporting element and the skin and the foaming of said material;

the provision of an injection mold, the injection mold comprising a first part and a second part that is movable relative to the first part between an open position and a closed position, the skin being placed in the first part of the injection mold, the injection mold being placed in the closed position after the placement of the supporting element on the skin;

the second part of the injection mold comprises a plunger, the plunger pushing the reinforcing element toward the deployed position during the deployment step of the reinforcing element;

the provision of the supporting element comprises the formation of the supporting element by injection, a pin being placed on the edge of the injection mold of the supporting element so as to form, in the supporting element, a guideway, and the placement of the reinforcing element in the guideway, the pin having a bevel shape, such that the guideway includes a contraction, to guarantee the sealing between the reinforcing element and the supporting element.

BRIEF DESCRIPTION OF THE DRAWINGS

The invention and its advantages will be better understood upon reading the following description, provided solely as an example, and done in reference to the appended drawings, in which:

FIG. 1 is a schematic sectional view of a step for manufacturing a trim element according to the prior art;

FIG. 2 is a schematic sectional view of a trim element according to the invention;

FIG. 3 is a sectional view of a detail of the trim element; and

FIGS. 4 to 7 are different steps of a method for manufacturing the trim element of FIG. 2.

DETAILED DESCRIPTION

Figure 7:
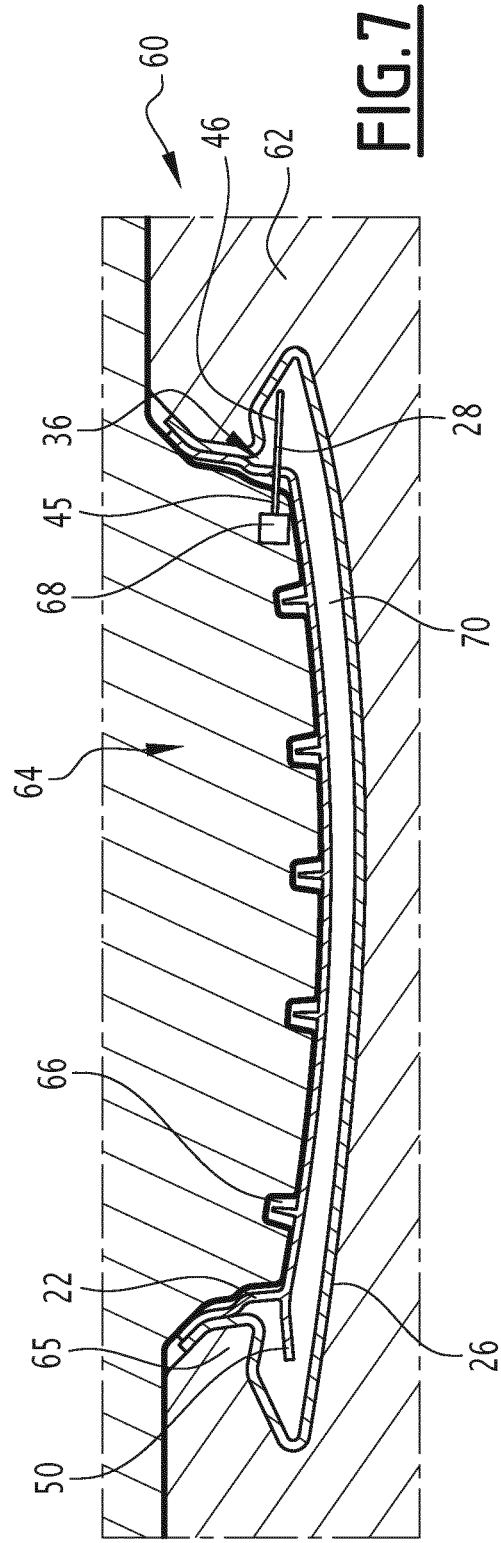

An example trim element 20 according to the invention is shown in FIGS. 2 and 3. FIGS. 4 to 7 show different steps for manufacturing the trim element 20.

The trim element 20 is for example a dashboard, a glovebox door, a center console, a door panel trim or the like.

The trim panel 20 is laminated and comprises, superimposed, a supporting element 22, a lining layer 24 and a skin 26. The lining layer 24 is inserted between the supporting element 22 and the skin 26 and provides the maintenance of the skin 26 on the supporting element 22. Furthermore, the trim element 20 comprises at least one reinforcing element 28.

In the example shown in FIG. 2, the trim element 20 comprises two shoulders 30, 32 forming the periphery of the trim element 20. The trim element 20 extends between the two shoulders 30, 32.

Each shoulder 30, 32 is formed by a local bulge of the lining layer 24 covered by a fold of the skin 26.

The supporting element 22 is rigid and imparts its curve and its mechanical strength to the trim element 20.

The supporting element 22 is for example made from a thermoplastic material, for example a polyolefin, whether homopolymer or copolymer, optionally comprising mineral fillers and/or a reinforcement with glass fibers, or for example PC-ABS (polycarbonate and acrylonitrile-butadiene-styrene) optionally reinforced by glass fibers. These materials have a rigidity making it possible to perform a supporting function. For example, the supporting element 22 is formed by injection. The supporting element 22 has a main surface 34 extending between a first edge 36 and a second edge 38 that are opposite one another.

The main surface 34 is for example in the form of a ply. The main surface 34 comprises an inner face 40 facing the skin 26 and an outer face 42 opposite the inner face 40. The outer face 42 for example faces toward the body of the vehicle when the trim element 20 is mounted in a vehicle. The inner face 40 of the supporting element 22 is covered by the lining layer 26.

The first edge 36 comprises the reinforcing element 28.

The reinforcing element 28 is mounted movably relative to the supporting element 22 between a retracted position and a deployed position. The reinforcing element 28 is shown in FIGS. 4 and 5 in the retracted position, in FIG. 6 in a position midway between the retracted position and the deployed position and in FIGS. 2 and 7 in the deployed position.

When the reinforcing element 28 is moved from the deployed position to the retracted position, it is said to move in the retraction direction. When the reinforcing element is moved from the retracted position to the deployed position, it is said to move in the deployment direction shown by arrow 44 in FIG. 5.

The reinforcing element 28 comprises a first portion 45 that projects opposite the main surface 34 having a first length L1 and a second portion 46 that projects from the main surface 34 having a second length L2.

The sum of the first length L1 and the second length L2 is equal to the length of the reinforcing element 28.

When the reinforcing element 28 goes from the retracted position to the deployed position, the first length L1 decreases and the second length L2 increases.

In the retracted position, the reinforcing element 28 extends primarily opposite the main surface 34. The reinforcing element 28 extends opposite the outer face 42 of the supporting element 22. In the retracted position, the first length L1 is strictly greater than the second length L2.

In one example, in the retracted position, the reinforcing element 28 is flush with the main surface 34 of the supporting element 22. In this case, the second length L2 is nil.

In a variant and as shown in FIGS. 4 and 5, in the retracted position, the second portion 46 forms a minority portion of the reinforcing element 28 that projects from the main surface 34 of the supporting element 22.

Advantageously, the size of the second portion 46 of the reinforcing element 28 that projects in the retracted position is suitable for allowing the insertion of the supporting element 22 in position in an injection mold 60, as will be described hereinafter.

In the deployed position, at least a portion 46 of the reinforcing element 28 projects from the main surface 34 of the supporting element 22 so as to reduce the length L1 of the portion 45 of the reinforcing element 28 extending opposite the main surface 34.

In the trim element 20, the projecting portion 46 extends in the shoulder 30 and is surrounded by the lining layer 24 when the reinforcing element 28 is in the deployed position.

The portion 46 of the reinforcing element 28 that projects when the reinforcing element 28 is in the deployed position is larger than the portion 46 of the reinforcing element 28 that projects when the reinforcing element 28 is in the retracted position.

The reinforcing element 28 is for example made from plastic. In a variant, the reinforcing element 28 is made from metal.

For example, the reinforcing element 28 is elongated along a longitudinal axis L. Advantageously, the reinforcing element 28 is translatable along a movement axis X. Advantageously, the movement axis X is co-linear with the longitudinal axis L of the reinforcing element 28.

In one example, the reinforcing element 28 is a rod.

In the example shown in FIG. 1, the reinforcing element 28 is locked in the deployed position by the lining layer 24. "Locked" means that the reinforcing element 28 cannot move toward its retracted position when it is embedded in the lining layer 24, the latter preventing the reinforcing element 28 from moving in the retraction direction.

The second edge 38 comprises a reinforcing rib 50. The reinforcing rib 50 projects from the main surface 34. The reinforcing rib 50 is secured to the main surface 34. For example, the reinforcing rib 50 is integral with the main surface 34. As shown in FIG. 2, the reinforcing rib 50 extends in the second shoulder 32. Furthermore, the reinforcing rib 50 is surrounded by and embedded in the lining layer 24.

Furthermore, the supporting element 30 comprises a guideway 52, intended to guide the movement of the reinforcing element 28 between the retracted position and the deployed position. The guideway 52 is shown in detail in FIG. 3.

The guideway 52 extends along the movement axis X of the reinforcing element 28.

Advantageously, the guideway 52 guides the movement of the reinforcing element while providing sealing between the reinforcing element 28 and the supporting element 22.

For example, the guideway 52 has a contraction 54, shown in FIG. 3, able to provide the sealing between the reinforcing element 28 and the supporting element 22 during the manufacture of the trim element 20, as will be described later.

The contraction 54 serves as a sealing gasket.

In one variant, the sealing gasket is a separate part from the guideway 52. Advantageously, the sealing gasket extends between the reinforcing element 28 and the supporting element 22.

Furthermore, the supporting element 22 advantageously has a stop, not shown, able to prevent the movement of the reinforcing element 28 in the retraction direction past its retracted position.

The lining layer 24 covers the inner face 40 of the main surface 34 and the edges 36, 38 of the supporting element 22. The lining layer 24 further extends past the edges 36, 38 so as to "overflow" on the side so as to cover the outer face of the reinforcing rib 50 and of the reinforcing element 28. Thus, the anchoring of the supporting element 22 in the lining layer 24 is provided.

The lining layer 24 is formed from a material that is compressible to the touch. The lining layer 24 is for example formed from a foam or a gel. The lining layer 24 is for example formed from a polyurethane (PU) foam.

The lining layer 24 is formed from an injectable precursor material. The precursor material is for example liquid and able to form the lining layer 24.

The skin 26 covers the lining layer 24.

The skin 26 is flexible. It for example assumes the form of a thin film made from synthetic or natural material. The skin 26 is for example provided in the form of a plastic sheet of a synthetic or natural, leather, leather substitute or similar fabric.

The skin 26 is deformable to the touch due to its flexibility and the compressibility to the touch of the lining layer 24. It is possible to push the skin 26 in toward the supporting layer 22 by pressing on the skin 26 with one or several fingers. This enhances the perceived quality of the trim element 20.

The skin 26 covers the edges of the lining layer 24 on the side of the outer face. This makes it possible to hide the edges of the lining layer and to provide the trim element 20 with a satisfactory esthetic appearance.

The skin 26 comprises an outer face 56 facing away from the supporting element 22 and an inner face 58 opposite the outer face 56 and facing away from the supporting element 22. The outer face 56 defines the visible surface of the trim element 20.

The inner face 58 of the skin 26 covers the lining layer 24.

An injection mold 60 used to manufacture the trim element 20 described above will now be described in reference to FIGS. 4 to 7.

The injection mold 60 comprises a first part 62 and a second part 64 that is movable relative to the first part 62 between an open position and a closed position. When the injection mold 60 is in the closed position, it defines an injection space 66 substantially assuming the shape of the trim element 20 to be formed.

The first part 62 of the injection mold 60 is intended to receive the skin 26. The second part 64 of the injection mold 60 is intended to hold the supporting element 22. Furthermore, the injection mold is such that the shape of the lining layer 24 is formed between the supporting element 22 and the skin 26 when the mold is in the closed position.

The first part 62 of the injection mold 60 comprises, on each side, an undercut area 65 so as to have a shape complementary to the shoulders 30 and 32. For example, the first part of the mold 62 is provided with a slide to allow the stripping of the shoulders 30 and 32 and the removal of the part after the formation of the lining layer 26.

Furthermore, the injection mold 60 comprises an injection device, not shown, able to inject a precursor material of the lining layer 24 between the skin 26 and the supporting layer 22 when the injection mold 60 is in the closed position.

Advantageously, the second part 62 of the injection mold 60 comprises a plunger 68. The plunger 68 is able to push the reinforcing element 28 in the deployment direction during the deployment step of the reinforcing element 28, as will be described hereinafter.

For example, the plunger 68 comprises a hydraulic jack.

In one variant, the plunger 68 is further able to move the reinforcement in the retraction direction to facilitate the adjustment of the position of the reinforcing element 28.

The method for manufacturing the trim element 20 will now be described in light of FIGS. 4 to 7.

The manufacturing method comprises providing a supporting element 22 as previously described.

The provision of the supporting element 22 for example comprises providing the supporting element 22 by injection. During the formation of the supporting element 22 by injection, a pin is placed on the edge of the injection mold of the supporting element 22 so as to form the guideway 52 in the supporting element 22.

Advantageously, the pin has a beveled shape, such that the guideway 52 includes the constriction 54, shown in FIG. 3, ensuring the sealing between the reinforcing element 28 and the supporting element 22.

The provision of the supporting element 22 further comprises the mounting of the reinforcing element 28 on the supporting element 22, such that the reinforcing element 28 is movably mounted relative to the supporting element 22 between the retracted position and the deployed position.

Advantageously, the reinforcing element 28 is placed in its retracted position.

For example, the reinforcing element 28 is inserted into the guideway 52, and moved in the retraction direction, up to the constriction 54 and past the constriction 54.

In one variant, a sealing gasket is placed around the reinforcing element 28 before it is inserted in the guideway 52.

Advantageously, the placement of the reinforcing element 28 is done just before the placement of the supporting element 22 in the injection mold 60.

The method for manufacturing the trim element 20 further comprises providing a skin 26 as previously described.

The injection mold 60 as previously described is provided.

The skin 26 is placed in the first part of the injection mold 60.

Next, the supporting element 22 is placed opposite the skin 26 so as to form a cavity 70 between the supporting element 22 and the skin 26.

The cavity 70 assumes the form of the trim element 24. The reinforcing element 28 is in the retracted position during the placement of the supporting element 22 in the injection mold 60 and can enter the first part of the mold without interference with the undercut area 65 making it possible to form the first shoulder 30.

The reinforcing element 28 is moved toward the deployed position. For example, the reinforcing element 28 is manually partially pushed by the operator toward the deployed position before the closing of the injection mold 60.

The injection mold 60 is placed in the closed position after the placement of the supporting element 24 opposite the skin 26.

Advantageously, as shown in FIG. 5, the plunger 68 of the second part 64 of the injection mold 60 pushes the reinforcing element 28 to the deployed position.

In the illustrated example, the reinforcing element 28 is first pushed manually in the deployment direction to a position midway between the retracted position and the deployed position, then the injection mold 60 is closed and the plunger 60 pushes the reinforcing element 28 to the deployed position. The supporting element 22 is blocked against the walls of the injection mold 60 and immobilized.

In a variant, the injection mold 60 is closed with the reinforcing element 28 in the retracted position, then the plunger 68 pushes the reinforcing element 28 from the retracted position to the deployed position during the step for deployment of the reinforcing element 28.

The reinforcing element 28 extends in the cavity 70 in the deployed position.

The manufacturing method next comprises the formation of the lining layer 24 in the cavity 70. For example, a foam precursor material is injected between the supporting element 22 and the skin 26. Then, the foam precursor material is hardened to form a foam.

The sealing gasket or the constriction 54 of the gutter prevents precursor material leaks during the formation of the lining layer 24.

In the example shown in FIG. 1, the reinforcing element 28 is locked in the deployed position by the lining layer 24. This is for example the case when the lining layer 24 adheres to the reinforcing layer 28 during the step for forming the lining layer 24 in the cavity 70.

In a variant, the materials of the lining layer 24 and the reinforcing element 28 are suited so that the lining layer 24 does not adhere to the reinforcing layer 28. The lining layer 24 then forms a sleeve around the reinforcing element 28. The sleeve extends in the extension of the gutter 52. The reinforcing element is not locked by the lining layer 24 and remains movable between the deployed position and the retracted position. This makes it possible to facilitate the handling of the trim element 1, for example, when the shoulder 30 must be deformed for an assembly or disassembly step of the trim element 1 in the vehicle.

Advantageously, the trim element 20 comprises a complementary locking device able to lock the reinforcing element 28 in the deployed position. This locking device prevents an untimely retraction of the reinforcing element 28.

This method makes it possible to produce trim elements 20 having complex shapes. Indeed, even if the shape is complex, the addition of the movable reinforcing element 28 makes it possible to stiffen certain areas without bothering manufacturing.

The obtained trim elements 20 are thus more resistant to mechanical and aging stresses. Furthermore, such a manufacturing method makes it possible to decrease the number of defective parts. Additionally, the reinforcing element 28 makes it possible to avoid the delamination or tearing of the lining layer 24 during handling by operators or occupants of the vehicle.

In a variant, the number of movable reinforcing elements 28 is different. For example, each edge 36, 38 comprises at least one movable reinforcing element 28.

In a variant, the positions and the shape of the reinforcing elements 28 are different.

The invention claimed is:

1. A vehicle trim element comprising:
   a supporting element having a main surface extending between two opposite edges,
   a lining layer covering the main surface and the edges of the supporting element, and
   a skin surrounding the lining layer,
   wherein at least one of said edges comprises a reinforcing element, the reinforcing element being movably mounted relative to the supporting element between a retracted position, wherein the reinforcing element extends primarily opposite the main surface, and a deployed position, wherein at least a portion of the reinforcing element projects from the main surface of the supporting element in such a way as to reduce the length of the portion of the reinforcing element extending in relation to the main surface, said projecting portion being surrounded by the lining layer.

2. The trim element according to claim 1, wherein the reinforcing element is locked in the deployed position by the lining layer.

3. The trim element according to claim 1, wherein the supporting element comprises a guideway, intended to guide the movement of the reinforcing element between the retracted position and the deployed position.

4. The trim element according to claim 3, wherein the guideway comprises a sealing gasket extending between the reinforcing element and the supporting element.

5. The trim element according to claim 1, wherein the supporting element extends between a first edge and a second edge opposite the first edge, the trim element comprising a reinforcing rib that projects from the first edge, the reinforcing element projecting from the second edge.

6. A method for manufacturing a vehicle trim element according to claim 1, comprising the following steps:
   providing a supporting element, having a main surface extending between two opposite edges, at least one of said edges comprising a reinforcing element, the reinforcing element being movably mounted relative to the supporting element between a retracted position, in which the reinforcing element extends primarily opposite the main surface, and a deployed position, in which at least part of the reinforcing element projects from the main surface of the supporting element so as to reduce the length of the portion of the reinforcing element extending opposite the main surface, providing a skin, placing the supporting element on the skin so as to form a cavity between the supporting element and the skin, said cavity assuming the form of the lining layer, the reinforcing element being in the retracted position during the placement of the supporting element, deploying the reinforcing element toward the deployed position, the reinforcing element extending in the cavity in the deployed position, and forming the lining layer in the cavity.

7. The manufacturing method according to claim 6, wherein the formation of the lining layer comprises the injection of a foam precursor material between the supporting element and the skin and the foaming of said material.

8. The manufacturing method according to claim 6, comprising the provision of an injection mold, the injection mold comprising a first part and a second part that is movable relative to the first part between an open position and a closed position, the skin being placed in the first part of the injection mold, the injection mold being placed in the closed position after the placement of the supporting element on the skin.

9. The manufacturing method according to claim 8, wherein the second part of the injection mold comprises a plunger, the plunger pushing the reinforcing element toward the deployed position during the deployment step of the reinforcing element.

10. The manufacturing method according to claim 8, wherein the provision of the supporting element comprises:

the formation of the supporting element by injection, a pin being placed on the edge of the injection mold of the supporting element so as to form a guideway in the supporting element, and the placement of the reinforcing element in the guideway, the pin having a bevel shape, such that the guideway includes a contraction that creates a seal between the reinforcing element and the supporting element.

* * * * *